Aug. 19, 1958   G. E. GREY   2,848,127
BALE WAGON
Filed March 16, 1956   4 Sheets-Sheet 3
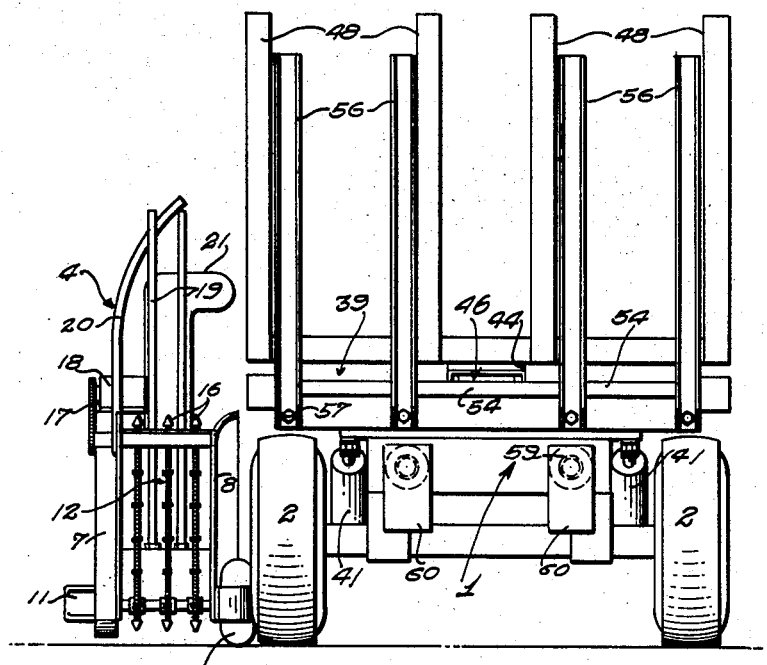
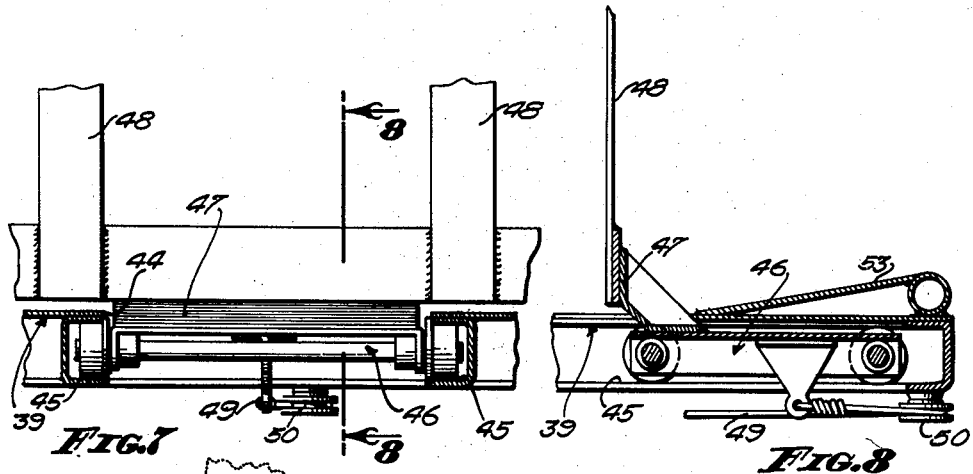
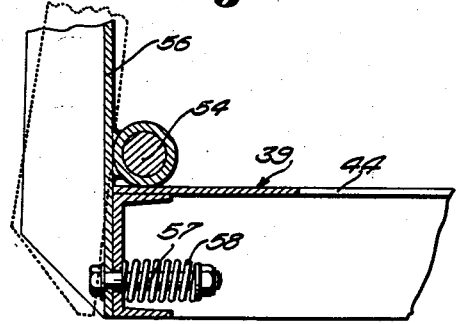
INVENTOR.
GORDON E. GREY
BY
ATTORNEYS

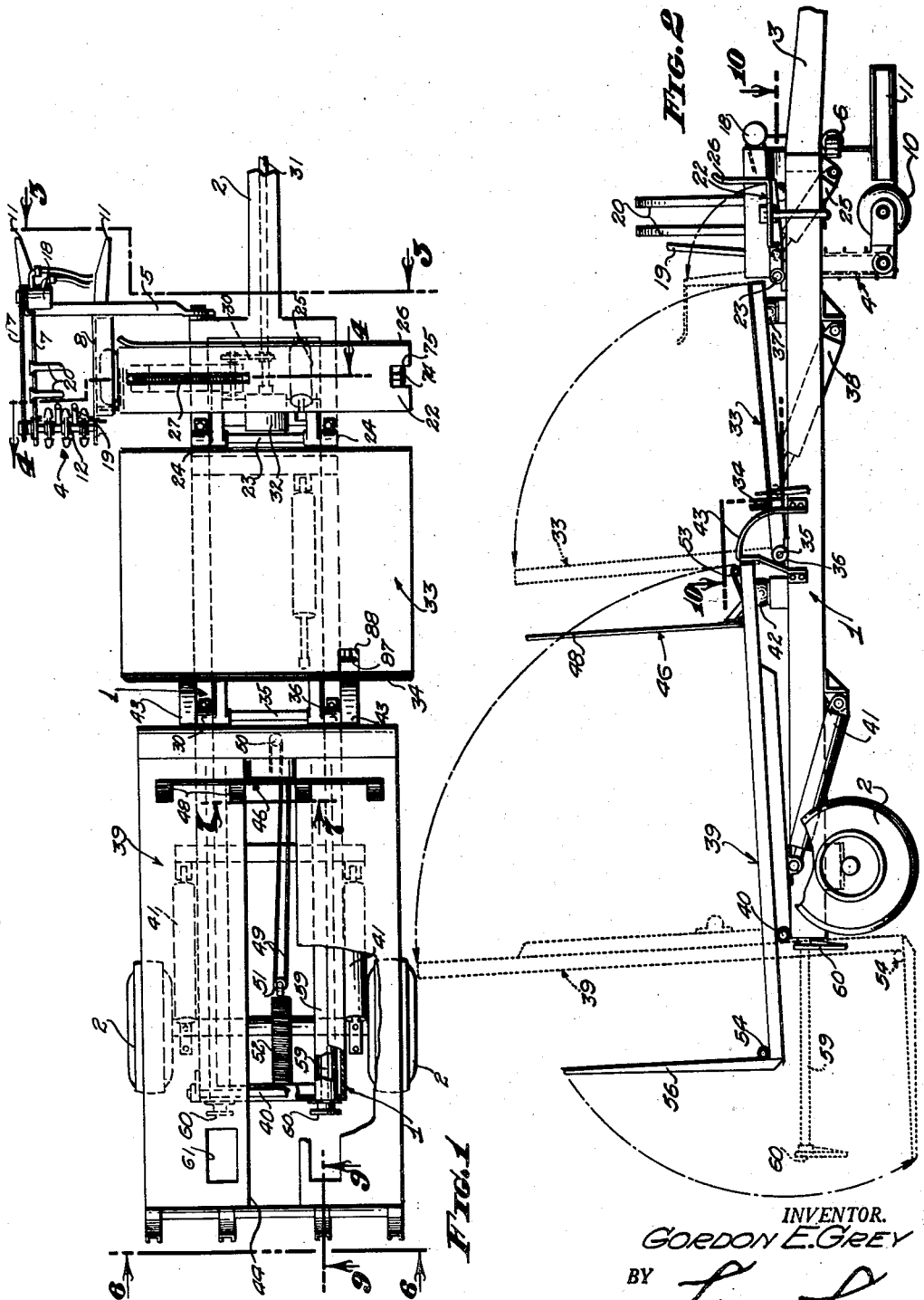

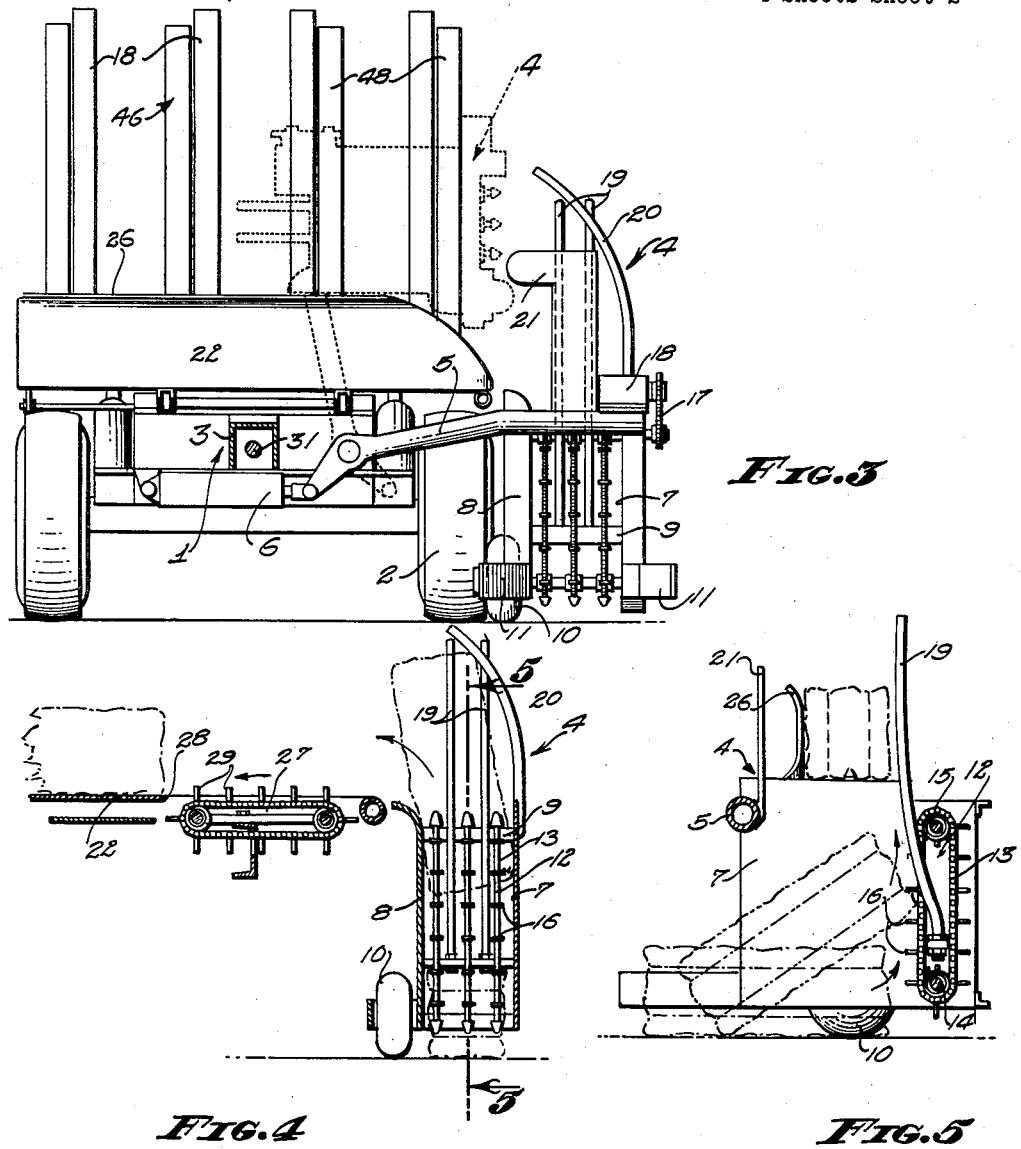

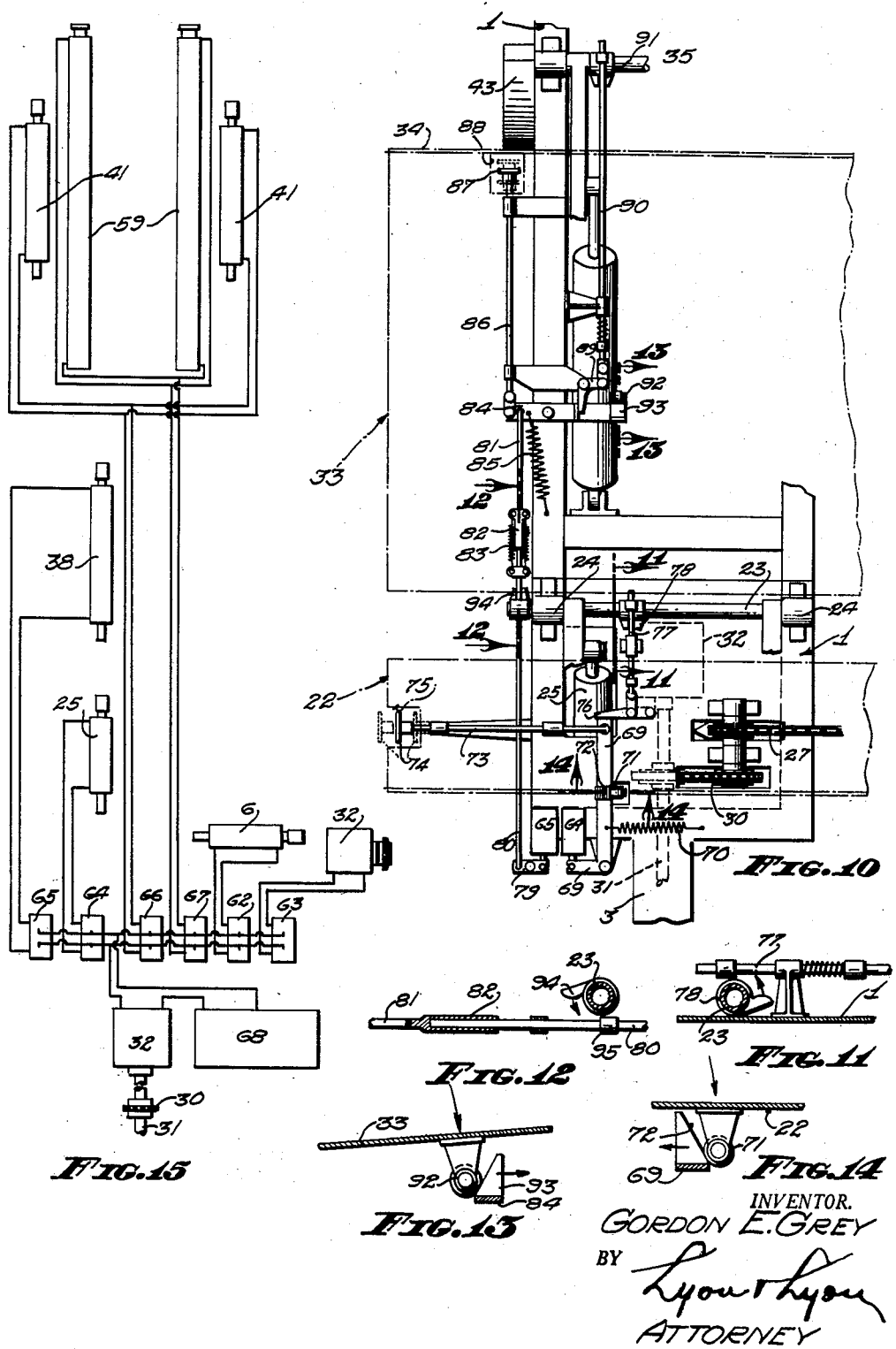

United States Patent Office 2,848,127
Patented Aug. 19, 1958

2,848,127

BALE WAGON

Gordon E. Grey, Lancaster, Calif.

Application March 16, 1956, Serial No. 571,934

21 Claims. (Cl. 214—510)

This invention relates to bale wagons, that is, to vehicles intended to handle baled products, such as baled hay. Included in the objects of this invention are:

First, to provide a bale wagon which incorporates an automatic loading device, operable as the wagon is driven down a field to pick up a series of hay bales and deposit them on the wagon.

Second, to provide a bale wagon wherein the hay bales are automatically stacked at the rear end of the wagon until the wagon is loaded, whereupon the wagon is used to transport the load to a delivery point.

Third, to provide a bale wagon wherein the load of baled hay is tilted on end, set on the ground, and forced from the wagon, without manual handling.

Fourth, to provide, in a bale wagon, a novel bale loader which may be readily and quickly moved between an operative position along side the wagon, and an inoperative, raised position within the side boundaries of the wagon, to permit use of the wagon to transport a load.

Fifth, to provide a bale wagon wherein the loading and unloading operations may be readily controlled by one operator, who also drives the tractor to which the wagon is attached.

With the above and other objects in view, as may appear hereinafter, reference is directed to the accompanying drawings in which:

Figure 1 is a top view of the bale wagon;

Fig. 2 is a side view thereof, indicating by broken lines the movement of the bed members in the course of loading and unloading the bales of hay;

Fig. 3 is an enlarged, partially transverse, sectional view and partially elevational view, taken through 3—3 of Fig. 1;

Fig. 4 is an enlarged, fragmentary, sectional view through 4—4 of Fig. 1;

Fig. 5 is a fragmentary, sectional view through 5—5 of Fig. 4;

Fig. 6 is an enlarged rear view of the bale wagon;

Fig. 7 is an enlarged, fragmentary, sectional view through 7—7 of Fig. 1;

Fig. 8 is a fragmentary, sectional view through 8—8 of Fig. 7;

Fig. 9 is a fragmentary, sectional view through 9—9 of Fig. 1;

Fig. 10 is a substantially diagrammatical view of the chassis, taken substantially along the line 10—10 of Fig. 2 and showing particularly the automatic control means for the receiving bed and transfer bed;

Fig. 11 is an enlarged, fragmentary, sectional view through 11—11 of Fig. 10;

Fig. 12 is an enlarged, fragmentary, sectional view through 12—12 of Fig. 10;

Fig. 13 is an enlarged, fragmentary, sectional view through 13—13 of Fig. 10;

Fig. 14 is an enlarged, fragmentary, sectional view through 14—14 of Fig. 10; and Fig. 15 is a diagrammatical view, illustrating the relationship of the hydraulic cylinders and their valves.

The bale wagon includes a chassis frame 1 comprising longitudinal frame members connected by suitable cross bars. The chassis frame is supported adjacent its rear end by a pair of rear wheels 2. The forward end of the chassis frame is provided with a hitch bar 3, shown fragmentarily, arranged for connection to a tractor, not shown.

Mounted at one side, at the forward end of the chassis frame 1, is a bale loader unit 4. The bale loader unit is supported by a laterally directed arm 5, which is movable about an axis longitudinal of the chassis frame by the action of a hydraulic cylinder 6, so that the bale loader unit 4 may be moved from a lower operative position, such as shown by solid lines in Fig. 3, and a raised inoperative position, indicated by broken lines in Fig. 3.

The bale loader unit 4 comprises a pair of normally vertical side walls 7 and 8 joined at their rear ends by cross braces 9 to form a U-shaped structure open at its forward end. The bale loader unit is supported in its lower or operative position by means of a ground wheel 10. The lower forward extremities of the side walls 7 and 8 are provided with forwardly directed diverging deflector arms 11, so arranged as to guide between the side walls 7 and 8 a bale of hay lying on the ground.

At the rear end of the bale loader unit 4 is a vertical conveyor, or nearly vertical conveyor, 12 comprising several chains 13 which pass over sprockets provided on lower and upper shafts 14 and 15. The chains are provided with lugs or prongs 16. The conveyor 12 is connected by a chain drive 17 to a hydraulic motor 18 carried by the loader unit. The supporting arm 5 for the loader unit 4 is joined to the upper forward extremities of the side walls 7 and 8 so that the bales of hay may pass under the arm.

Mounted between the conveyor chains 13 are stripper bars 19 which slope upwardly and forwardly so as to strip the bales of hay from the lugs 16. The upper end of the outboard side wall 8 is provided with upwardly extending tipping bars 20 which curve toward the chassis 1 so as to deflect the upper end of the bale of hay. In addition, a guard member 21 may extend upwardly from the arm 5 between the side walls 7 and 8 to prevent forward tipping of the bale of hay.

In practice, the bale wagon is drawn forwardly and guided so that a series of hay bales resting in the field enter between the deflector arms 11, engage the conveyor 12, and are first tilted to a vertical position and then lifted and tilted laterally toward the chassis 1, as indicated by broken lines in Figs. 4 and 5.

The bales of hay are delivered from the bale loader unit 4 onto a receiving bed 22. The receiving bed extends transversely at the forward end of the chassis frame 1 and is of a width corresponding to the width of a bale of hay and has a length equal to two bales of hay.

The receiving bed 22 is provided with a pair of rearwardly directed arms which are joined to a journal shaft 23 extending transversely of the chassis frame 1 or supported thereon by bearings 24. A hydraulic cylinder 25 mounted within the chassis frame 1 is so connected to the receiving bed 22 that it may be raised from its normal horizontal position, shown by solid lines in Fig. 2, to a vertical position, indicated by broken lines in Fig. 2. The forward margin of the receiving bed 22 is provided with a guard rail 26.

Mounted on the chassis frame 1, under the receiving bed 22, is a short chain conveyor 27 extending from the receiving end of the bed 22 adjacent the loader unit 4 to a point approximately midway of the receiving bed. The receiving bed is provided with an accommodation slot 28 through which extend lugs or prongs 29 carried by the chain conveyor. The chain conveyor 27 engages a bale of hay delivered by the loader unit 4 and moves the bale to the remote end of the receiving bed 22.

The chain conveyor 27 is connected by a chain drive 30 to a drive shaft 31, which extends along the hitch bar 3 and is driven by a suitable conventional power take-off unit, not shown, provided on the tractor. The drive shaft 31 also operates a hydraulic pump or generator 32 employed to actuate the hydraulic motor 18, hydraulic cylinder 25, and other hydraulic cylinders as will be described hereinafter.

Mounted on the chassis frame 1 rearwardly of the receiving bed 22 is a transfer bed 33. The transfer bed is equal in width to the receiving bed 22, but has a length longitudinally of the chassis equal to four bales of hay, so as to support two rows of four bales each.

The rear end of the transfer bed 33 is provided with a guard rail 34, and is provided with rearwardly extending supporting arms which are connected to a journal shaft 35 disposed transversely of the chassis 1 and carried by bearings 36. The transfer bed normally rests in a slightly inclined position with its rear margin supported by pads 37 in a position slightly above and rearwardly of the receiving bed 22, so that when the receiving bed 22 is tilted to a vertical position a pair of hay bales thereon may be deposited on the transfer bed 33.

One or more hydraulic cylinders 38 are connected between the chassis frame 1 and the transfer bed 33 for the purpose of tilting the transfer bed to a vertical position. The rear portion of the chassis frame 1 supports a load-carrying bed 39 which overhangs the rear end of the chassis a distance equal to the height of the chassis frame above the ground.

Suitable hinge means 40 at the rear end of the chassis frame 1 so supports the load-carrying bed 39 that the bed may be tilted from a substantially horizontal position to a vertical position, as indicated in Fig. 2. This movement is accomplished by hydraulic cylinders 41 suitably attached to the chassis frame 1 and load-carrying bed 39. The forward end of the load-carrying bed 39 rests on pads 42 which support the load-carrying bed in a slightly inclined position.

The forward margin of the load-carrying bed 39 is located slightly above and rearwardly of the transfer bed 33, so that when the transfer bed 33 is tilted to an upright position, its load of baled hay may be delivered to the load-carrying bed. To aid in retaining the baled hay in position during such transfer, there is provided at each side of the chassis frame 1 a guide shoe 43.

The load-carrying bed 39 is provided with a central longitudinal opening 44 bordered by channel tracks 45 underlying the upper surface of the load-carrying bed. A carriage 46 is adapted to travel in the slot or opening 44 and is provided with wheels which ride in the tracks 45. The carriage includes a bracket 47 which extends upwardly through the slot or opening 44 and terminates in a cross member, extending substantially the width of the load-carrying bed 39, and to which are attached upwardly extending tines 48. These tines are of sufficient height to form a side support for a stack of four bales.

The carriage 46 is connected to a cable 49, which passes around a fixed sheave 50 and a traveling sheave 51, and is anchored to the load-carrying bed 39. The traveling sheave is connected to one end of a spring 52, the other end of which is anchored. The arrangement of the cable 49 and spring 52 is such that the carriage 46 and traveling tines 48 normally occupy a position adjacent the forward end of the load-carrying bed 39. The normal forward position of the traveling tines is approximately the width of one bale of hay. The forward portion of the load-carrying bed 39 is preferably inclined upwardly from the normal level of the bed, as indicated by 53, so that the load of bales delivered by the transfer bed 33 tend to lean against the tines 48.

Connected to the rear extremities of the load-carrying bed 39 by means of a hinge 54 is a series of rear tines 56 preferably spaced so that they are offset from the traveling tines 48. The rear tines are yieldably held in an upright position by means of tension bolts 57 and their springs 58, as shown best in Fig. 9. The lower ends of the rear tines 56 overhang the rear end of the load-carrying bed 39 so that the rear tines cannot tilt backward, but by reason of the tension bolts 57 and springs 58 may tilt forwardly a limited amount.

Mounted on the chassis 1 under the load-carrying bed 39 is a pair of longitudinally extending ram cylinders 59. The ram cylinders are provided with ram bars which terminate in ram heads 60, normally located at the rear end of the chassis frame 1. As will be brought out hereinafter, the ram heads 60 move rearwardly when the load-carrying bed 39 is in its vertical or dotted line position shown in Fig. 2. For this purpose, the load-carrying bed 39 is provided with accommodation slots 61.

Suitably mounted at the forward end of the chassis frame 1, but omitted from the views with the exception of the diagrammatical view 15, is a series of control valves for the various cylinders. More specifically these are: control valve 62 for the bale loader unit cylinder 6, control valve 63 for the hydraulic motor 18, control valve 64 for the receiving bed cylinder 25, control valve 65 for the transfer bed cylinder 38, control valve 66 for the load-carrying bed cylinders 41, and control valve 67 for the ram cylinders 59. Also included in the hydraulic system is a reservoir 68.

Each of the control valves 62, 63, 64, 65, 66, and 67 is a four-way valve arranged to feed hydraulic fluid into either end of the corresponding cylinder, with the exception of the control valve 63 which need drive the hydraulic motor 18 in only one direction. Each of the control valves may be conventional, manually-operated, valves.

However, it is preferred to provide automatic means for operating the control valves 64 and 65 associated with the receiving bed 22 and the transfer bed 33. An automatic control means for this purpose is shown in Figs. 10 through 14. A control lever 69 is connected to the control valve 64 and is movable from an intermediate or neutral position to either one of two extreme positions. The control valve is urged to one extreme position by means of a spring 70, this position being the one which causes the corresponding cylinder 25 to retract and move the receiving bed 22 from its vertical to its horizontal or normal position.

Mounted on the under side of the receiving bed 22 is a cam-engaging roller 71 which engages a cam 72 on the control lever 69 in such a manner as to move the control lever from its normal extreme position to its intermediate or neutral position when the receiving bed 22 is in its horizontal or solid line position.

Connected to the control lever 69 is a rod 73 suitably guided for longitudinal movement in bearings supported from the chassis 1, and which terminates in a push plate 74 which extends upwardly through a slot 75, provided in the end of the receiving bed 22 remote from the bale loader unit 4.

The push plate 74 is adapted to be engaged by the first of two bales as the second bale is moved on to the receiving bed 22, so as to move the control lever 69 to its other extreme position for the purpose of extending the hydraulic cylinder unit 25 and raising the receiving bed 22 to its vertical position. When the control lever 69 moves to this extreme position, a catch lever 76 engages the control lever to prevent return movement.

The catch lever 76 is connected to a release rod 77 which is engaged by a cam 78 carried by the journal shaft 23. When the receiving bed 22 reaches its vertical position, the catch lever 76 releases the control lever 69 so that the position of the control valve 64 is reversed by action of the spring 70, and the receiving bed 22 is caused to return to its horizontal position. Whereupon the control lever 69 is moved to its neutral position by the roller 71.

It will thus be seen that the receiving bed 22 automatically delivers a pair of bales to the transfer bed 33 as soon as the second bale is delivered to the receiving bed. Each pair of bales, as they are delivered to the transfer bed 33, push the preceding pair of bales rearward until the transfer bed 33 is filled.

To effect automatic tilting of the transfer bed 33, a lever 79 is connected to the hydraulic cylinder 65 which in turn is connected to tandemly-disposed rod sections 80 and 81 extending forwardly along the side of the chassis 1. The rod section 80 is provided with a sleeve 82 which fits over the adjacent end of the rod 80. Tension springs 83 are connected between the rod sections 80 and 81 to yieldably hold the rod section 80 in the sleeve 82. The rod section 81 is connected to a lever 84 pivotally mounted on the chassis frame 1 under the transfer bed 33.

The lever 84 is urged by a spring 85 in a direction to cause the control valve 65 to retract the cylinder unit 38. Also connected to the lever 84 is a control rod 86 which is suitably guided in slide bearings along the side of the chassis frame 1 and which terminates in a push plate 87 extending upwardly through an accommodation slot 88 provided in the transfer bed 33.

The push plate 87 is adapted to be engaged by a bale of hay as the last pair of bales is placed on the transfer bed 33 by the receiving bed 22. This movement of the push plate 87 reverses the position of the control valve 65 so as to cause the hydraulic cylinder unit 38 to raise the transfer bed 33.

A catch lever 89 engages the lever 84 to hold the lever in position to maintain the control valve 65 in position for expanding the transfer bed cylinder 38. A release rod 90 moves the catch lever 89 clear of the lever 84 when engaged by a cam 91 carried by the journal shaft 35 of the transfer bed 33, similar to the manner in which the release rod 37 and cam 38 release the catch lever 76.

The under side of the transfer bed 33 is provided with a roller 92 which engages a cam 93 provided on the catch lever 89, so that when the transfer bed 33 moves to its horizontal position the lever 84 is moved to a position to effect movement of the control valve 65 to its neutral position.

It will thus be seen that the control means for the valve 64 and valve 65 are similar in operation.

It is desirable, however, that the transfer bed 33 be prevented from tilting upward until the receiving bed 22 has returned to its horizontal position, or at least moved clear of the bales of hay deposited on the transfer bed. As shown best in Fig. 12, this is accomplished by means of a cam 94 mounted on the journal shaft 23 associated with the receiving bed 22, which engages a collar 95 provided on the rod section 80, so that the rod section 80 is prevented from moving rearward with the rod section 81 when the push plate 87 is engaged. The adjustment of the cam 94 and collar 95 is such that the rod 80 is not released until the receiving bed 22 is clear of the transfer bed 23.

Operation of the bale wagon is as folows:

The baled hay or other baled product to be collected by the bale wagon is field-baled and the individual bales are left lying more or less in rows in the field. The bale wagon is drawn by a tractor along the row of bales and guided in such a manner that the bale loader unit 4 aligns with each bale so that the end of the bale enters between the side walls 7 and 8, as indicated in Figs. 4 and 5.

The end of the bale is engaged by the vertical conveyor 12 which first tilts the bale to an upright position and then lifts the bale a sufficient distance so that the bale may fall laterally onto the receiving bed 22. This is accomplished by means of tipping bars 20. The bale on being received by the bed 22 is advanced laterally by the chain conveyor 27. However, the first of a pair of bales is not advanced far enough to engage the push plate 74.

The second bale is moved laterally by the conveyor 27 to force the first bale against the push plate 74, so that when the receiving bed 22 has received two bales of hay the receiving bed automatically tilts to a vertical position and deposits the pair of bales on the forward margin of the transfer bed 33. This action is repeated, each pair of bales forcing the preceding pair of bales rearwardly on the transfer bed 33 until the push plate 87 is engaged. Thereupon, as soon as the receiving bed 22 has moved clear, the transfer bed tilts to its vertical position, indicated by broken lines in Fig. 2, depositing the eight bales in a vertical stack at the forward end of the load-carrying bed 39.

By reason of the fact that the load-carrying bed 39 is disposed at a slight angle, and the receiving edge 53 thereof is inclined, the stack of eight bales leans against the forward or traveling tines 48. With each oscillation of the transfer bed 33 succeeding stacks of bales are deposited on the load-carrying bed 39, forcing the preceding stacks and traveling tines 48 rearwardly until the load-carrying bed 39 is completely filled.

The bale wagon is then hauled to the place of storage of the baled hay and backed adjacent to the previously stacked hay, whereupon the load-carrying bed 39 is tilted to its vertical position so that the entire load of baled hay is supported by the rear tines 56. The overhang of the load-carrying bed 39 is such that the rear tines 56 rest on the ground or are closely adjacent the ground when the load-carrying bed 39 is disposed uprightly.

After the load of hay has been tilted to a vertical position, the ram cylinders 57 are operated so that the ram heads 60 press against the load. The bale wagon and tractor are allowed to roll forwardly as the ram heads 60 push rearwardly so that the rear tines 56 are withdrawn from the stack of baled hay. The load-carrying bed 39 is then returned to its normal position and the bale wagon is ready to receive a second load.

While the receiving bed 22 and transfer bed 33 have been described as arranged to receive a particular number of bales, this is by way of example only, as these beds may be designed for a greater or lesser number of bales, depending upon the size of the machine and the size of the bales to be handled.

When transporting the bale wagon, whether loaded or empty, the bale loader unit 4 is tilted to its upper or inoperative position, indicated by broken lines in Fig. 3. By this arrangement the bale loader unit is moved out of the way, and the effective width of the bale wagon is reduced so that it may travel on a highway.

While the receiving bed 22, transfer bed 33, and load-carrying bed 39 have been shown as formed of sheet metal for simplification of the illustration, it should be understood that these beds may be formed of open framework.

While a particular embodiment of this invention has been shown and described, it is not intended to limit the same to the exact details of the construction set forth, and it embraces such changes, modifications, and equivalents of the parts and their formation and arrangement as come within the purview of the appended claims.

I claim:

1. A bale wagon, comprising: a chassis structure; a receiving bed, a transfer bed, and a load-carrying bed arranged in tandem on said chassis structure; means for depositing a row of bales on said receiving bed; means for delivering rows of bales from said receiving bed to said transfer bed to form a layer of bales thereon; and means for delivering layers of said bales to said load-carrying bed to form a stack of bales thereon.

2. A bale wagon, comprising: a chassis structure; a receiving bed, a transfer bed, and a load-carrying bed arranged in tandem on said chassis structure; means for depositing a row of bales on said receiving bed; means for delivering rows of bales from said receiving bed to said transfer bed to form a layer of bales thereon; means for delivering layers of said bales to said load-carrying bed to form a stack of bales thereon; and means for tilting said load-carrying bed to deposit said stack of bales on a surface rearwardly of said chassis structure.

3. A bale wagon, comprising: a chassis structure; a receiving bed, a transfer bed, and a load-carrying bed arranged in tandem on said chassis structure; means for depositing a row of bales on said receiving bed; means for tilting said receiving bed to deliver rows of bales to said transfer bed to form a horizontal layer of bales thereon; means for tilting said transfer bed to an upright position at an end of said load-carrying bed to arrange said layer in a stack on said load-carrying bed; and means on said load-carrying bed movable longitudinally thereof, for retaining said bales in stacked form and to permit longitudinal displacement of the stacked bales as additional bales are delivered by said transfer bed.

4. A bale wagon, comprising: a chassis structure; a receiving bed, a transfer bed, and a load-carrying bed arranged in tandem on said chassis structure; means for depositing a row of bales on said receiving bed; means for tilting said receiving bed to deliver rows of bales to said transfer bed to form a horizontal layer of bales thereon; means for tilting said transfer bed to an upright position at an end of said load-carrying bed to arrange said layer in a stack on said load-carrying bed; means on said load-carrying bed movable longitudinally thereof, for retaining said bales in stacked form and to permit longitudinal displacement of the stacked bales as additional bales are delivered by said transfer bed; means for tilting said load-carrying bed to an upright position; tine means for retaining said stack of bales thereon as said load-carrying bed is moved to its upright position; and means for withdrawing said tine means from under said stack of bales to deposit said stack on a surface rearwardly of said chassis structure.

5. A bale wagon, comprising: a chassis structure; a receiving bed, a transfer bed, and a load-carrying bed arranged in tandem on said chassis structure; a bale loading apparatus disposed at one side of said chassis and adapted to be guided so as to receive a series of bales lying on the ground, said apparatus including elevating means for depositing each bale on said receiving bed to form a row of bales thereon; means for delivering rows of bales from said receiving bed to said transfer bed to form a layer of bales thereon; and means for delivering layers of said bales to said load-carrying bed to form a stack of bales thereon.

6. A bale wagon, comprising: a chassis structure; a receiving bed, a transfer bed, and a load-carrying bed arranged in tandem on said chassis structure; a bale loading apparatus disposed at one side of said chassis and adapted to be guided so as to receive a series of bales lying on the ground, said apparatus including elevating means for depositing each bale on said receiving bed to form a row of bales thereon; means for delivering rows of bales from said receiving bed to said transfer bed to form a layer of bales thereon; means for delivering layers of said bales to said load-carrying bed to form a stack of bales thereon; and means for tilting said load-carrying bed to deposit said stack of bales on a surface rearwardly of said chassis structure.

7. A bale wagon, comprising: a chassis structure; a receiving bed, a transfer bed, and a load-carrying bed arranged in tandem on said chassis structure; a bale loading apparatus disposed at one side of said chassis and adapted to be guided so as to receive a series of bales lying on the ground, said apparatus including elevating means for depositing each bale on said receiving bed to form a row of bales thereon; means for tilting said receiving bed to deliver rows of bales to said transfer bed to form a horizontal layer of bales thereon; means for tilting said transfer bed to an upright position at one end of said load-carrying bed to arrange said layer in a stack on said load-carrying bed; and means on said load-carrying bed movable longitudinally thereof, for retaining said bales in stacked form and to permit longitudinal displacement of the stacked bales as additional bales are delivered by said transfer bed.

8. A bale wagon, comprising: a chassis structure; a receiving bed, a transfer bed, and a load-carrying bed arranged in tandem on said chassis structure; a bale loading apparatus disposed at one side of said chassis and adapted to be guided so as to receive a series of bales lying on the ground, said apparatus including elevating means for depositing each bale on said receiving bed to form a row of bales thereon; means for tilting said receiving bed to deliver rows of bales to said transfer bed to form a horizontal layer of bales thereon; means for tilting said transfer bed to an upright position at one end of said load-carrying bed to arrange said layer in a stack on said load-carrying bed; means on said load-carrying bed movable longitudinally thereof, for retaining said bales in stacked form and to permit longitudinal displacement of the stacked bales as additional bales are delivered by said transfer bed; means for tilting said load-carrying bed to an upright position; tine means for retaining said stack of bales thereon as said load-carrying bed is moved to its upright position; and means for withdrawing said tine means from under said stack of bales to deposit said stack on a surface rearwardly of said chassis structure.

9. A bale wagon, comprising: a wheel-supported maneuverable chassis adapted to be moved along a series of bales lying on the ground; a bale elevator pivotally mounted at the forward end of said chassis about an axis longitudinal of said chassis and movable between a lower operative position at one side of said chassis and a raised inoperative position above and within the lateral boundaries of said chassis; said bale elevator including a frame open at its forward end and adapted to be guided by maneuvering said chassis into registry with a series of bales lying along the ground; vertical conveyor means at the rear end of said bale elevator for upending and vertically raising a bale; and deflector means for directing said bale laterally onto said chassis.

10. A bale wagon, comprising: a wheel-supported maneuverable chassis adapted to be moved along a series of bales lying on the ground; a bale elevator pivotally mounted at the forward end of said chassis about an axis longitudinal of said chassis and movable between a lower operative position at one side of said chassis and a raised inoperative position above and within the lateral boundaries of said chassis; said bale elevator including a frame open at its forward end and adapted to be guided by maneuvering said chassis into registry with a series of bales lying along the ground; vertical conveyor means at the rear end of said bale elevator for upending and vertically raising a bale; deflector means for directing said bale laterally onto said chassis; a receiving bed mounted on said chassis adapted to receive a row of bales from said bale elevator, including conveyor means for moving said bales laterally across said chassis; and means rearwardly of said receiving bed for accepting rows of bales therefrom and arranging said bales into a multiple bale stack.

11. A bale wagon, comprising: a wheel-supported maneuverable chassis adapted to be moved along a series of bales lying on the ground; a bale elevator pivotally mounted at the forward end of said chassis about an axis longitudinal of said chassis and movable between a lower operative position at one side of said chassis and a raised inoperative position above and within the lateral boundaries of said chassis; said bale elevator including a frame open at its forward end and adapted to be guided by maneuvering of said chassis into registry with a series of bales lying along the ground; vertical conveyor means at the rear end of said bale elevator for upending and vertically raising a bale; deflector means for directing said bale laterally onto said chassis; a receiving bed mounted on said chassis adapted to receive a row of bales from said bale elevator, including conveyor means for moving said bale laterally across said chassis; means rearwardly of said receiving bed for accepting rows of bales therefrom and arranging said bales into a multiple bale stack; and means for depositing said stack intact on the ground rearwardly of said chassis.

12. A bale wagon, comprising: a wheel-supported maneuverable chassis adapted to be moved along a series of bales lying on the ground; a bale elevator pivotally mounted at the forward end of said chassis about an axis longitudinal of said chassis and movable between a lower operative position at one side of said chassis and a raised inoperative position above and within the lateral boundaries of said chassis; said bale elevator including a frame open at its forward end and adapted to be guided by maneuvering said chassis into registry with a series of bales lying along the ground; conveyor means at the rear end of said bale elevator for upending and raising a bale; deflector means for directing said bale onto said chassis; a receiving bed mounted on said chassis adapted to receive a row of bales from said bale elevator, including conveyor means for moving said bales laterally across said chassis; a transfer bed disposed rearwardly of said receiving bed and arranged to accept said rows of bales to form a layer thereof; means for tilting said transfer bed to dispose each layer of bales upright; and a load-carrying bed adapted to receive a series of upright layers of bales from said transfer bed to form a multiple bale stack.

13. A bale wagon, comprising: a wheel-supported maneuverable chassis adapted to be moved along a series of bales lying on the ground; a bale elevator pivotally mounted at the forward end of said chassis about an axis longitudinal of said chassis and movable between a lower operative position at one side of said chassis and a raised inoperative position above and within the lateral boundaries of said chassis; said bale elevator including a frame open at its forward end and adapted to be guided by maneuvering of said chassis into registry with a series of bales lying along the ground; conveyor means at the rear end of said bale elevator for upending and raising a bale; deflector means for directing said bale onto said chassis; a receiving bed mounted on said chassis adapted to receive a row of bales from said bale elevator, including conveyor means for moving said bales laterally across said chassis; a transfer bed disposed rearwardly of said receiving bed and arranged to accept said rows of bales to form a layer thereof; means for tilting said transfer bed to dispose each layer of bales upright; a load-carrying bed adapted to receive a series of upright layers of bales from said transfer bed to form a multiple bale stack; means on said load-carrying bed to retain said bales in stack form, and including upright tines at the rear of said load-carrying bed; means for tilting said bed so that said stack of bales rests on said tines; and means for withdrawing said tines from under said stack of bales to deposit the stack on the ground rearwardly of said chassis.

14. A bale wagon, comprising: a chassis structure; a bale elevator mounted at one side thereof and including a bale-receiving frame and an elevating conveyor at the rear thereof, and a deflecting means to direct bales from said elevating conveyor laterally onto said chassis structure; means on said chassis structure for receiving said bales and arranging said bales in rows; means for redisposing said bales into a multiple row layer of bales; and means for redisposing said layers into a multiple layer stack of bales.

15. A bale wagon, comprising: a chassis structure; a bale elevator mounted at one side thereof and including a bale-receiving frame and an elevating conveyor at the rear thereof, and a deflecting means to direct bales from said elevating conveyor laterally onto said chassis structure; means on said chassis structure for receiving said bales and arranging said bales in rows; means for redisposing said bales into a multiple row layer of bales; means for redisposing said layers into a multiple layer stack of bales; means for tilting said stack of bales on end; means for supporting said stack when tilted; and means for withdrawing said last named means from under said stack to deposit said stack intact on an underlying surface.

16. A bale wagon, comprising: a chassis structure; a bale elevator mounted at one side thereof adapted to deposit a bale crosswise of said chassis; means for assembling a predetermined number of bales delivered by said bale elevator into a layer of bales comprising a series of transverse rows of bales; means for upending said layer to form a unit of stacked bales; a load-carrying bed for said stacked bales; and support means for said stacked bales movable along said load-carrying bed, as additional units of stacked bales are upended on the load-carrying bed until a predetermined number of stacked units are disposed on said load-carrying bed.

17. A bale wagon, comprising: a chassis structure; a bale elevator mounted at one side thereof adapted to deposit a bale crosswise of said chassis; means for assembling a predetermined number of bales delivered by said bale elevator into a layer of bales comprising a series of transverse rows of bales; means for upending said layer to form a unit of stacked bales; a load-carrying bed for said stacked bales; support means for said stacked bales movable along said load-carrying bed, as additional units of stacked bales are upended on the load-carrying bed until a predetermined number of stacked units are disposed on said load-carrying bed; means for tilting said load-carrying bed to a vertical position and upending the bales stacked thereon with said support means thereunder; and means for withdrawing said support means from under said stack of bales.

18. A bale wagon, comprising: a chassis structure; a bale elevator mounted at one side thereof adapted to deposit a bale crosswise of said chassis; means for assembling a predetermined number of bales delivered by said bale elevator into a unit of stacked bales; a load-carrying bed for said units adapted to receive said units at one end thereof; a carriage structure extending upwardly from said bed for retaining the bales of said units in a stacked condition, said carriage structure being movable along said bed to permit placement of additional units of stacked bales thereon.

19. A bale wagon, comprising: a chassis structure; a bale elevator mounted at one side thereof adapted to deposit a bale crosswise of said chassis; means for assembling a predetermined number of bales delivered by said bale elevator into a unit of stacked bales; a load-carrying bed for said units adapted to receive said units at one end thereof; a carriage structure extending upwardly from said bed for retaining the bales of said units in a stacked condition, said carriage structure being movable along said bed to permit placement of additional units of stacked bales thereon; means for tilting said bed to a vertical position whereby said units of stacked bales are disposed upended above said carriage structure; and means engageable with said upended units to retain said bales in position thereby to permit withdrawal of said carriage structure.

20. A bale wagon, comprising: a chassis structure; a bale elevator mounted at one side thereof adapted to deposit a bale crosswise of said chassis; means for assembling a predetermined number of bales delivered by said bale elevator into a unit of stacked bales; a load-carrying bed for said units adapted to receive said units at one end thereof; a plurality of upright movable tines on said bed and arranged to retain said units of bales in a stacked position, said tines being displaceable along said bed as additional units are placed thereon; a plurality of upright fixed tines at the extremity of said bed, said fixed and movable tines cooperating to hold said bale units when said bed is loaded; means for tilting said bed to a vertical position whereby said load of bale units is upended and said fixed and movable tines underlie said load of bale units; and means engageable with a side of said upended load of bale units to retain said load in position while said tines are withdrawn from under said load.

21. A bale wagon, comprising: a load-carrying bed adapted to receive units of stacked bales at one end thereof; a plurality of upright movable tines for retaining said units of stacked bales and movable along said bed as additional units of stacked bales are placed thereon until a load of said units of stacked bales are received by said bed; a plurality of upright fixed lines at the end of said bed opposite from said receiving end, said fixed and movable tines cooperating to hold said load; means for tilting said bed to a vertical position whereby said load of bale units is upended and said fixed and movable tines underlie said load of bale units; and means engageable with a side of said upended load of bale units to retain said load in position while said tines are withdrawn from under said load.

References Cited in the file of this patent

UNITED STATES PATENTS

| | | |
|---|---|---|
| 2,418,726 | Rogers | Apr. 8, 1947 |
| 2,468,424 | Brauch | Apr. 26, 1949 |
| 2,508,698 | Von Beren | May 23, 1950 |
| 2,615,586 | Miller et al. | Oct. 28, 1952 |
| 2,733,821 | Willrodt | Feb. 7, 1956 |
| 2,761,578 | Brownlee et al. | Sept. 4, 1956 |